(12) United States Patent  (10) Patent No.: US 6,561,560 B2
Brown et al.  (45) Date of Patent: May 13, 2003

(54) VEHICLE CARGO AREA EXTENDER

(75) Inventors: Julie Brown, Dearborn, MI (US); Marc Iafrate, Troy, MI (US); Keith Godin, Dearborn, MI (US); Troy Reed, Livonia, MI (US)

(73) Assignee: Plastech Engineered Products, Dearborn, MI (US)

( * ) Notice: Subject to any disclaimer, the term of this patent is extended or adjusted under 35 U.S.C. 154(b) by 0 days.

(21) Appl. No.: 09/927,249

(22) Filed: Aug. 10, 2001

(65) Prior Publication Data

US 2003/0030295 A1 Feb. 13, 2003

Related U.S. Application Data

(60) Provisional application No. 60/224,847, filed on Aug. 11, 2000.

(51) Int. Cl.[7] ................................................. B60R 9/06
(52) U.S. Cl. .................................... 296/26.11; 296/37.6
(58) Field of Search ......................... 296/26.11, 26.08, 296/37.6, 37.1, 50, 57.1; 224/402, 403, 404

(56) References Cited

U.S. PATENT DOCUMENTS

| 1,242,035 A | 10/1917 | Pierson et al. |
| 1,266,521 A | 5/1918 | Norquist |
| 1,272,620 A | 7/1918 | Carlson |
| 1,289,997 A | 12/1918 | Wyeth |
| 1,655,777 A | 1/1928 | Weiland |
| 1,764,615 A | 6/1930 | Edwards |
| D160,213 S | 9/1950 | Samuelson ..................... D14/6 |
| 2,621,357 A | 12/1952 | Stuman ........................ 16/114 |
| 2,626,179 A | 1/1953 | Gonzalez ..................... 296/26 |
| 2,720,414 A | 10/1955 | Hart ........................... 296/12 |
| 2,795,363 A | 6/1957 | Turner ..................... 224/42.43 |
| 3,902,599 A | 9/1975 | Stromberg .................. 206/511 |
| 4,023,850 A | 5/1977 | Tillery ......................... 296/26 |
| 4,136,905 A | 1/1979 | Morgan ........................ 296/50 |
| 4,419,794 A | 12/1983 | Horton, Jr. et al. ........... 24/667 |
| 4,451,075 A | 5/1984 | Canfield .................... 296/37.6 |
| 4,470,716 A | 9/1984 | Welch ........................ 403/254 |
| 4,472,639 A | 9/1984 | Bianchi ....................... 296/26 |
| 4,531,773 A | 7/1985 | Smith .......................... 296/26 |
| 4,573,730 A | 3/1986 | Gondert et al. ................ 296/1 |

(List continued on next page.)

Primary Examiner—Glenn Dayoan
Assistant Examiner—Patricia Engle
(74) Attorney, Agent, or Firm—Bliss McGlynn, P.C.

(57) ABSTRACT

A vehicle cargo area extender including a pair of sidewalls, a center wall extending between the pair of sidewalls and a lid removably disposed relative to the pair of sidewalls and the center wall. The sidewalls, the center wall and the lid cooperate to define an enclosure having an open end. The vehicle cargo area extender is moveably mounted between a stored position relative to a vehicle cargo area wherein the open end of the enclosure is adjacent to the rear wall of the vehicle cargo area and a deployed position so as to be supported by the rear wall of the vehicle cargo area when it is in its extended position such that the open end of the enclosure faces the vehicle cargo area thereby increasing the effective size of the vehicle cargo area.

18 Claims, 9 Drawing Sheets

U.S. PATENT DOCUMENTS

| | | | |
|---|---|---|---|
| 4,596,417 A | 6/1986 | Bennett | 296/61 |
| 4,635,992 A | 1/1987 | Hamilton et al. | 296/37.6 |
| 4,652,035 A | 3/1987 | Austin, Jr. | 296/1 |
| D291,789 S | 9/1987 | Noga | D12/98 |
| 4,749,226 A | 6/1988 | Heft | 296/37.6 |
| 4,750,773 A | 6/1988 | Chapline et al. | 296/37.6 |
| 4,778,213 A | 10/1988 | Palmer | 296/26 |
| 4,786,119 A | 11/1988 | Smuda | 312/195 |
| D300,734 S | 4/1989 | Kruitbosch | D12/155 |
| 4,824,158 A | 4/1989 | Peters et al. | 296/37.6 |
| 4,828,312 A | 5/1989 | Kinkel et al. | 296/37.6 |
| 4,830,242 A | 5/1989 | Painter | 224/42.32 |
| 5,024,409 A | 6/1991 | Bohnen | 248/222.4 |
| 5,037,153 A | 8/1991 | Stark | 296/37.6 |
| 5,083,829 A | 1/1992 | Fonseca | 296/37.6 |
| D326,076 S | 5/1992 | Wiese | D12/155 |
| 5,114,203 A | 5/1992 | Carnes | 296/50 |
| 5,123,691 A | 6/1992 | Ginn | 296/37.1 |
| 5,147,103 A | 9/1992 | Ducote | 296/37.6 |
| 5,154,470 A | 10/1992 | Bringman, Jr. | 296/26 |
| 5,169,200 A | 12/1992 | Pugh | 296/37.6 |
| 5,201,562 A | 4/1993 | Dorsey | 296/39.2 |
| 5,207,469 A * | 5/1993 | Rossi | 296/37.6 |
| 5,253,913 A | 10/1993 | Metivier | 296/37.6 |
| 5,468,038 A | 11/1995 | Sauri | 196/57.1 |
| D365,323 S | 12/1995 | Napierkowski et al. | D12/414 |
| 5,622,296 A | 4/1997 | Pirhonen et al. | 224/197 |
| 5,658,033 A | 8/1997 | Delaune | 296/26 |
| 5,700,047 A | 12/1997 | Leitner et al. | 296/26 |
| 5,730,342 A | 3/1998 | Tien | 224/271 |
| 5,743,589 A | 4/1998 | Felker | 296/180.5 |
| 5,752,800 A | 5/1998 | Brincks et al. | 414/537 |
| 5,755,480 A | 5/1998 | Bryan | 296/26 |
| 5,765,892 A | 6/1998 | Covington | 296/26 |
| 5,775,759 A | 7/1998 | Cummins | 296/26 |
| 5,806,907 A | 9/1998 | Martinus et al. | 296/26.11 |
| 5,820,188 A | 10/1998 | Nash | 296/26 |
| 5,823,596 A * | 10/1998 | Kulesza | 296/26.08 |
| 5,853,116 A | 12/1998 | Schreiner | 224/404 |
| 5,857,724 A | 1/1999 | Jarman | 296/26 |
| 5,911,464 A * | 6/1999 | White | 296/26.11 |
| 6,113,173 A | 9/2000 | Leitner et al. | 296/26.11 |
| 6,155,622 A * | 12/2000 | Reed | 296/26.08 |
| 6,170,724 B1 * | 1/2001 | Carter et al. | 224/404 |
| 6,174,012 B1 * | 1/2001 | Saffold | 296/37.6 |
| 6,186,575 B1 * | 2/2001 | Fisher et al. | 296/100.03 |
| 6,402,215 B1 * | 6/2002 | Leitner et al. | 296/26.11 |

* cited by examiner

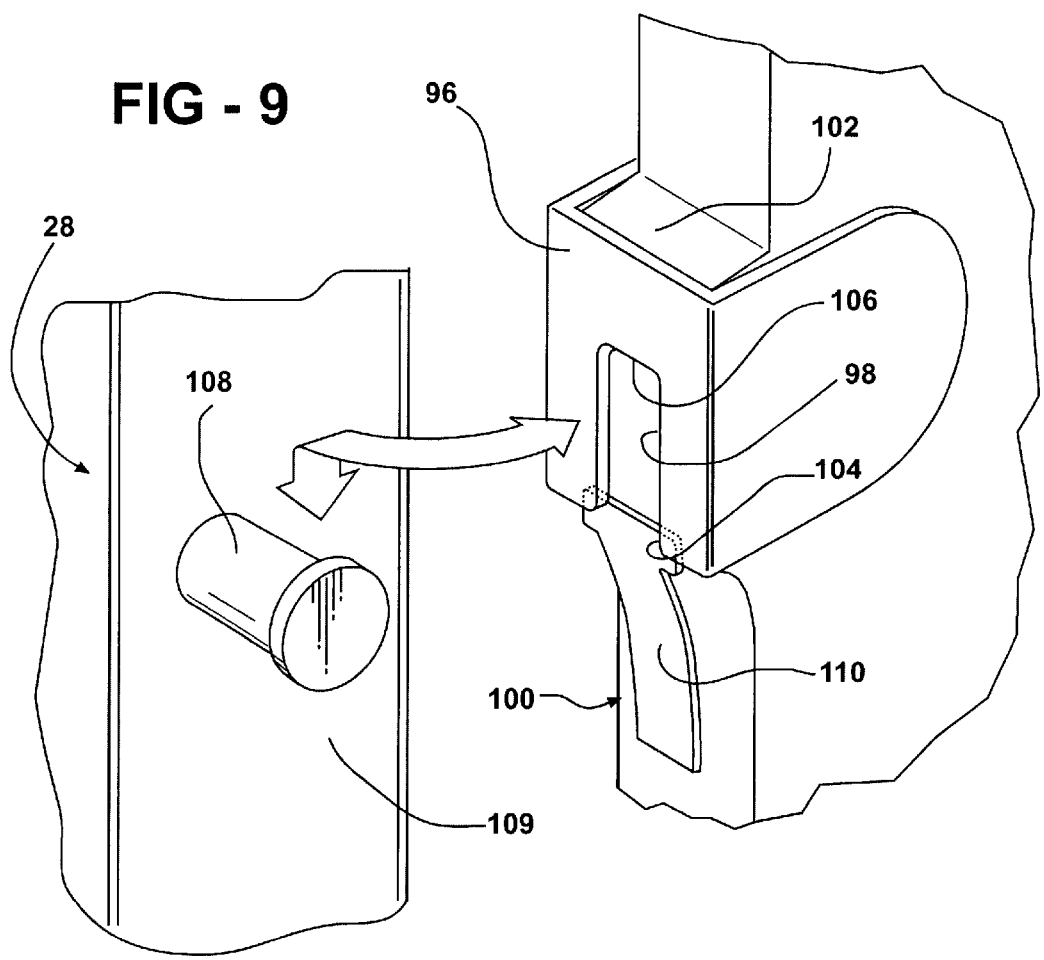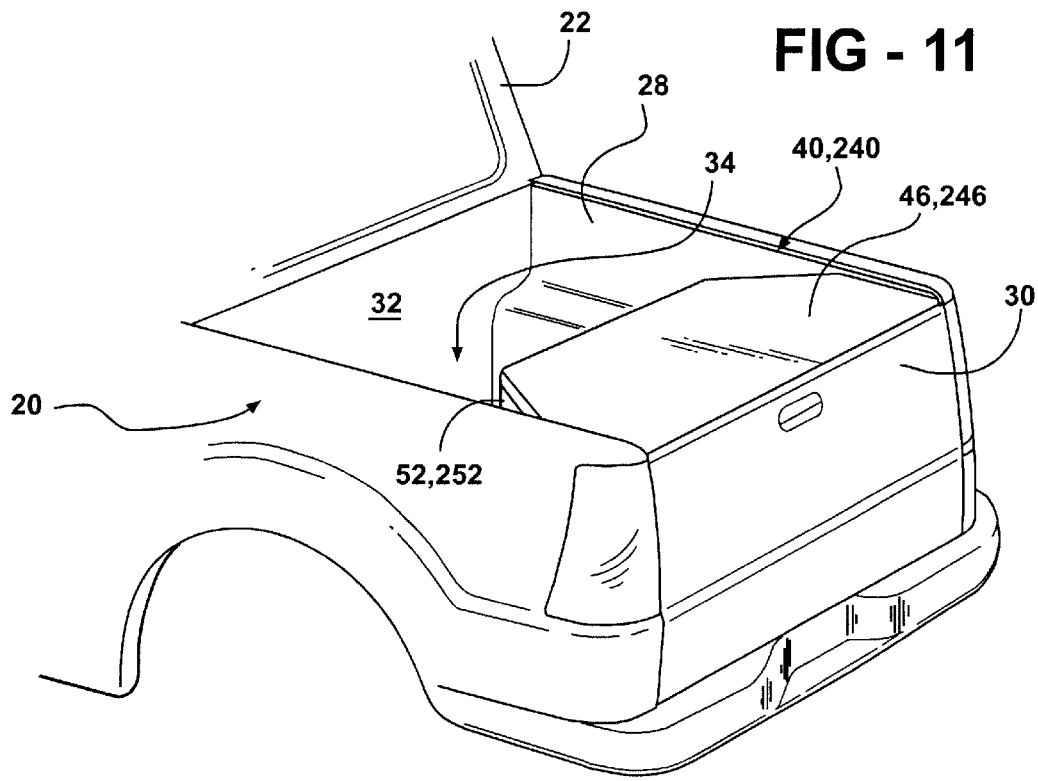

VEHICLE CARGO AREA EXTENDER

This application claims the benefit of U.S. provisional application entitled Truck Bed Aerodynamic Storage Container having Ser. No. 60/224,847 filed Aug. 11, 2000.

BACKGROUND OF THE INVENTION

1. Field of the Invention

The present invention relates, generally, to a vehicle cargo area extender, and more specifically, to a vehicle cargo area extender that defines an enclosure and that may be movably supported with respect to the cargo area of a vehicle between a stored position forward of the tailgate and a deployed position wherein it is supported by the tailgate when the tailgate is "down" or in an extended position.

2. Description of the Related Art

Pickup trucks and like vehicles have cargo areas that are employed for utilitarian purposes. A representative example of this type of vehicle is generally indicated at 20 in FIG. 1. As is well known in the art, such vehicles typically include a cab 22 in which the vehicle operator sits and a cargo area, generally indicated at 24. The cargo area 24 is typically disposed adjacent and to the rear of the cab 22. The cargo area 24 is typically defined by a bed 26 (FIG. 2) and pair of upstanding sidewalls 28 spaced from one another on either side of the bed 26. In addition, the vehicle 20 typically includes a rear wall or "tailgate" 30 that extends between the pair of sidewalls 28 at one end of the bed 26 and a front wall 32 located at the other end of the bed 26 opposite to the tailgate 30. The rear wall or tailgate 30 is usually hingedly mounted to the bed 26 so as to be rotatable between an upright position (FIG. 1) and an extended position as shown in FIG. 2. When it is in its extended position, the tailgate 30 is said to be "down" or "open" and is usually disposed substantially co-planar with the bed 26 of the vehicle cargo area 24. When it is disposed in its upright position, the tailgate 30 extends substantially perpendicularly between the pair of sidewalls 28. In this disposition, together the sidewalls 28, the tailgate 30 and front wall 32 define a perimeter of the vehicle cargo area 24.

Numerous accessories have been developed for the purpose of augmenting the utilitarian functions of the cargo area 24 in such vehicles. For example, toolboxes and other, similar storage devices have been employed to provide a secure enclosure for storing tools and other valuable implements in the otherwise open cargo area 24 of vehicles, such as pickup trucks 20. Such toolboxes and the like are typically mounted between the sidewalls 28 and the front wall 32 proximate to the cab 22 of the vehicle 20. While such toolboxes adequately function for their intended purposes, they also act to reduce the remaining available cargo area 24 of the vehicle 20.

Another common accessory employed in connection with the cargo area of a vehicle such as a pickup truck is known as a "Tonneau Cover". Tonneau covers known in the related art are often constructed of canvas, wood, or metal panels that extend between the upper margins of the sidewalls 28 from the front wall 32 to the tailgate 30. Tonneau covers serve to enclose the cargo area 24 thereby providing a modicum of protection for tools and other cargo. Tonneau covers also act to reduce the aerodynamic drag caused by uncovered cargo areas. However, tonneau covers suffer from the disadvantage that they inhibit free access to the entire cargo area 24 of the vehicle 20.

Another vehicle accessory that has gained popularity in recent years is generally known as a "Truck Bed Extender".

Truck bed extenders known in the related art are usually employed with the tailgate 30 "down" or in the extended position as shown in FIG. 2. The bed extender is mounted to the sidewalls 28 and is supported by the tailgate 30. In this way, truck bed extenders known in the related art serve to increase the effective length of the bed 26 of the pickup truck 20.

Numerous variations on the truck bed extender theme have been proposed in the related art. For example, such devices may be manufactured of steel, can be relatively heavy and adapted for use only when the tailgate 30 is down. Alternatively, other bed extenders known in the related art include a series of light-weight panels that are designed to be foldable when not in use or when the tailgate 30 is disposed in its upright position. In addition, bed extenders consisting of flexible netting or perforated steel grating have been proposed as a substitute for the tailgate 30 itself. These devices are designed to extend the useful length of the truck bed 26 while reducing the aerodynamic drag caused by the tailgate 30 when it is in its upright position.

While such bed extenders known in the related art have generally worked for their intended purposes, disadvantages still remain. For example, generally speaking, the bed extenders known in the related art provide no means for securely storing or protecting cargo from the elements or from theft. In addition, some bed extenders that have been proposed in the related art tend to be mechanically complex, involve cumbersome mounting requirements and related hardware.

Accordingly, there remains a need in the art for a device that serves to extend the effective cargo area defined by the vehicle bed 26, sidewalls 28 and tailgate 30 while providing a means for securely storing tools and other valuable cargo, and at the same time protecting such valuable cargo from the elements and from theft. In addition, there is a need in the art for such a device that reduces the aerodynamic drag nominally caused by the vehicle cargo area, especially when the tailgate 30 is disposed in its upright position. Furthermore, there is a need in the related art for such a device that encompasses all of these features while still allowing open access to a portion of the cargo area 24 of the vehicle 20.

SUMMARY OF THE INVENTION AND ADVANTAGES

The present invention overcomes the disadvantages in the related art in a vehicle cargo area extender that is adapted to be employed in conjunction with a vehicle having a cargo area defined by a bed and a pair of upstanding sidewalls. In such vehicles, the upstanding sidewalls are typically spaced from one another on either side of the vehicle bed. A rear wall is disposed between the upstanding sidewalls at one end of the vehicle bed. Furthermore, the rear wall is typically rotatable from an upright position to an extended position so as to be disposed substantially coplanar with the bed. Accordingly, the vehicle cargo area extender of the present invention includes a pair of sidewalls spaced from one another, a center wall that extends between the pair of sidewalls and a lid that is removably disposed relative to the pair of sidewalls and the center wall. The pair of sidewalls, the center wall and the lid cooperate to define an enclosure having an open end. Furthermore, the vehicle cargo area extender of the present invention is removably mountable between a stored position wherein the open end of the enclosure is adjacent to the rear wall of the vehicle cargo area when it is disposed to in its upright position thereby closing the open end of the cargo area extender. In addition, the vehicle cargo area extender of the present invention may be moved to a deployed position so as to be supported by the rear wall of the vehicle cargo area when the rear wall is in its extended position such that the open end of the enclosure faces the vehicle cargo area thereby increasing the effective size of the vehicle cargo area.

Accordingly, one advantage of the vehicle cargo area extender of the present invention is that it serves to it increase the effective cargo area defined by the vehicle bed 26, sidewalls 28 and tailgate 30 while, at the same time, providing a means for securely storing tools and other valuable cargo, and protecting such cargo from the elements and theft.

Another advantage of the vehicle cargo area extender of the present invention is that it reduces the aerodynamic drag nominally caused by the vehicle cargo area.

Another advantage of the vehicle cargo area extender of the present invention is that it provides the above-identified features while still allowing open access to a portion of the cargo area 24 of the vehicle 20.

Still another advantage of the vehicle cargo area extender of the present invention is that it is light-weight, durable, versatile, and user-friendly. Furthermore, the present invention is inexpensive to manufacture, cost effective and facilitates enhanced utility of the cargo area 24 found in pickup trucks and like vehicles.

Other advantages of the present invention will be readily appreciated, as the same becomes better understood by reference to the following detailed description when considered in connection with the accompanying drawings as described below.

BRIEF DESCRIPTION OF THE DRAWINGS

FIG. 9 is an assembly view of the pivoting mechanism of the present invention.

FIG. 11 is a perspective view of the present invention shown in its stored position with respect to a vehicle cargo area;

DETAILED DESCRIPTION OF THE PREFERRED EMBODIMENTS

Figure 1:
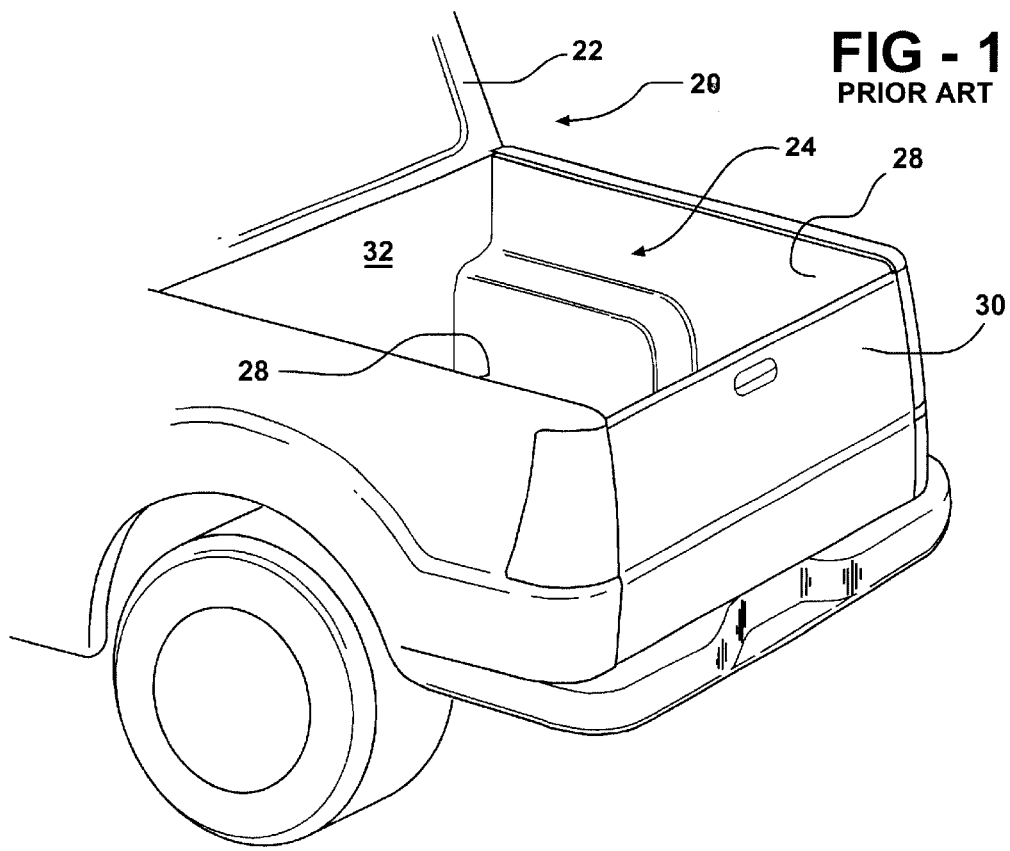
FIG. 1 is a vehicle having a cargo area defined by a pair of sidewalls, a front wall and a rear wall, with the rear wall disposed in its upright "closed" position.
Figure 2:
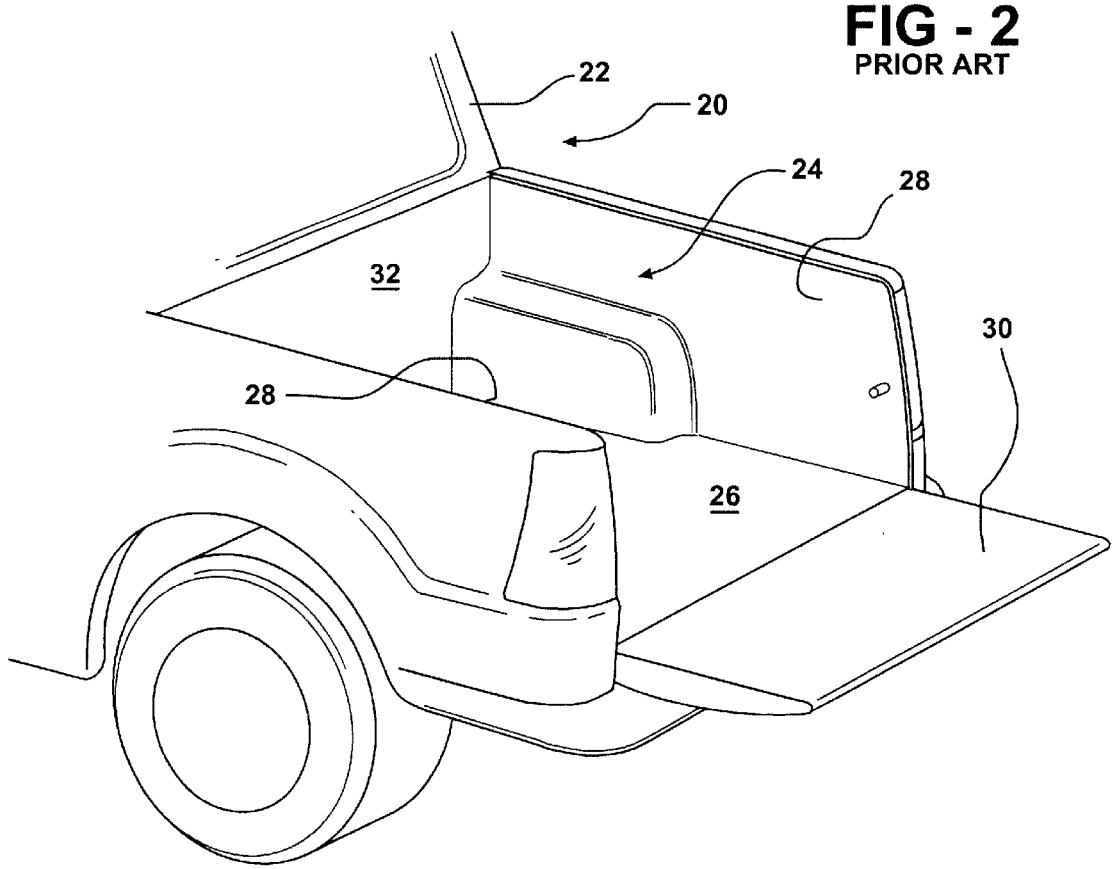
FIG. 2 is a vehicle having a cargo area defined by a pair of sidewalls, a front wall and a rear wall, with the rear wall disposed in its extended, "down" or "opened" position.

With the foregoing description of the related art in mind, the present invention is a vehicle cargo area extender, generally indicated at 40, 240 in FIGS. 3–18, where like numerals are used to designate like structure throughout the drawings. The vehicle cargo area extender 40, 240 is adapted to be employed in conjunction with a vehicle 20 of the type generally illustrated in FIGS. 1 and 2. As noted above, such vehicles 20 typically have a cargo area 24 defined by a bed 26 and a pair of upstanding sidewalls 28 spaced from one another on either side of the vehicle bed 26. In addition, the cargo area 24 is defined by a rear wall 30 extending between the upstanding sidewalls 28 at one end of the vehicle bed 26. The rear wall 30 is typically rotatable from an upright position to an extended position so as to be disposed substantially coplanar with the vehicle bed 26.

Figure 3:
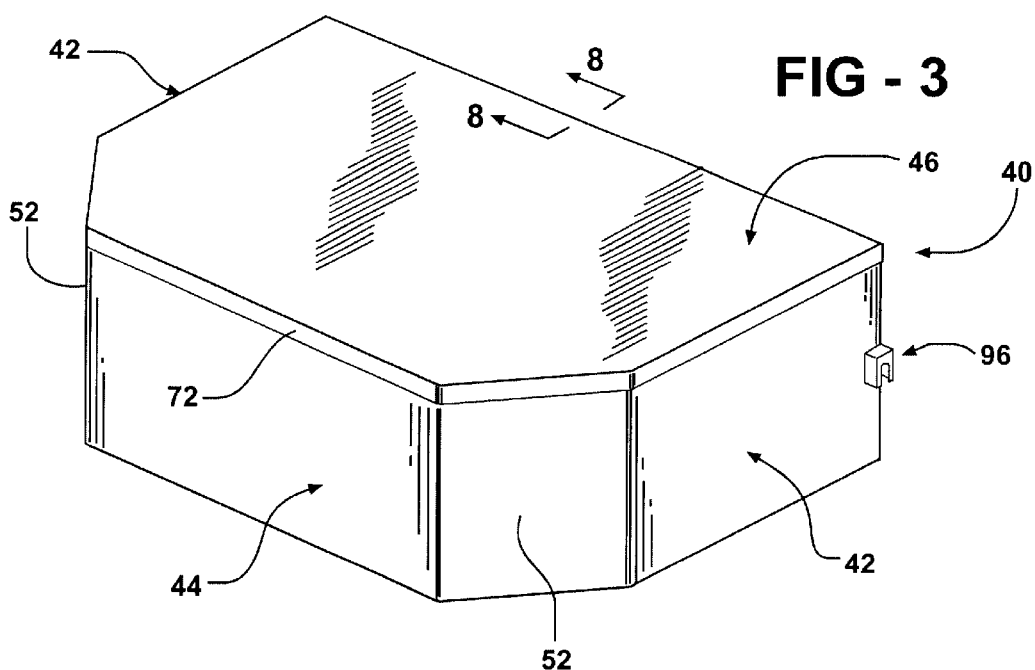
FIG. 3 is a perspective view of the vehicle cargo area extender of the present invention.

Referring now specifically to FIG. 3, the cargo bed extender 40 of the present invention includes a pair of sidewalls, generally indicated at 42, disposed spaced from one another, a center wall, generally indicated at 44, extending between the pair of sidewalls 42 and a lid, generally indicated at 46. The lid 46 is removably disposed relative to the pair of sidewalls 42 and the center wall 44 as will be described in greater detail below. The pair of sidewalls 42, the center wall 44 and the lid 46 cooperate to define an enclosure 48 having an open end 50 (FIGS. 7, 11, 14 and 17). In addition, the pair of sidewalls 42 and the center wall 44 cooperate to define a pair of swept-back portions 52 extending at obtuse angles relative to and between the planes defined by the adjacent side 42 and center walls 44.

More specifically, each swept-back portion 52 is disposed between an associated sidewall 42 and the center wall 44. Each of the sidewalls 42, the center wall 44 and the swept-back portions 50 define substantially vertical or upright planes relative to the vehicle bed 26 when the cargo area extender 40 is mounted to a vehicle as will be described in greater detail below.

Figure 4:
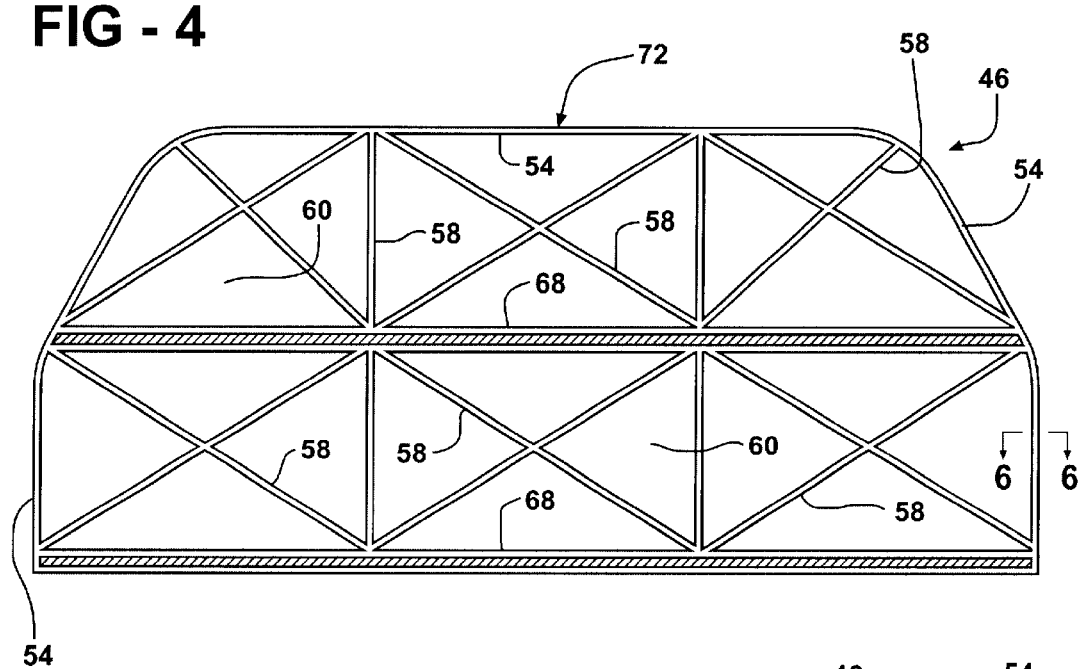
FIG. 4 is a side view of the lid of the present invention.
Figure 5:
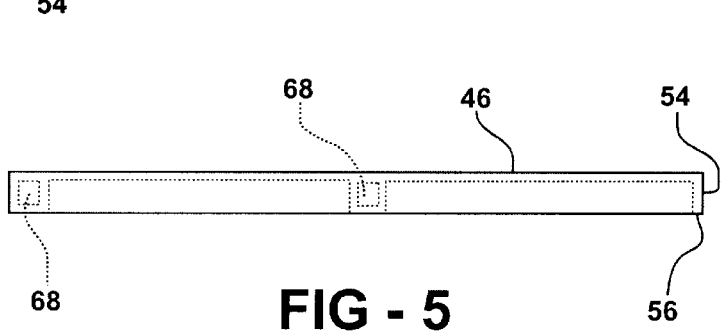
FIG. 5 is an end view of the lid of the present invention.
Figure 6:
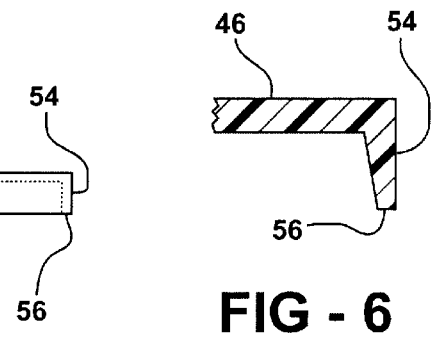
FIG. 6 is a cross-section taken substantially through lines at 6—6 of FIG. 4.

Together, the planer sidewalls 42, center wall 44 and swept-back portions 52 define a perimeter of the enclosure 48. On the other hand, and referring now to FIG. 4, the lid 46 defines a six-sided perimeter that is coextensive with the perimeter defined by the sidewalls 42, center wall 44 and swept-back portions 52. As best shown in FIGS. 4 and 6, in its operative mode, the lid 46 defines a downwardly extending flange 54 that extends for at least a substantial portion of the perimeter defined by the lid 46. The distal end 56 of the flange 54 is adapted for abutting contact with the upper margin of the sidewalls 42, center wall 44 and swept-back portions 52. Furthermore, the interaction of the flange 54 with the upper margins of the side and center walls as well as the swept-back portions may act to seal the enclosure 48 from above as will be explained in greater detail later in this description of the preferred embodiments.

Each of the pair of sidewalls 42, the center wall 44 and the lid 46 may include reinforced portions that provide strength to the vehicle cargo area extender 40. More specifically, with continuing reference to FIG. 4, reinforced portions may include ribs 58 defined on the inner surface 60 of the lid 46 that faces the enclosure 48. Similarly, with additional reference to FIG. 17, it will be appreciated that the reinforced portions may include ribs 62 on the inner surfaces 64, 65, 66 of each of the pair of sidewalls 42 the swept-back portions 52 and the center wall 44, respectively. The inner surfaces 64, 65, 66 preferably face the enclosure 48. However, those having ordinary skill in the art will appreciate that the strengthening ribs 58 on the lid 46 as well as the strengthening ribs 62 on the sidewalls 42, the center wall 44 and the swept-back portions 52 may also be formed on the surfaces of the these components opposite the enclosure 48. Furthermore, the reinforced portions may also include steel reinforcements extending for a portion of at least one of the pair of sidewalls 42, the center wall 44, the swept-back portions 52 and the lid 46. For example, with reference back to FIGS. 4 and 5, the lid 46 may include steel reinforcements 68 spaced from one another in any convenient manner and extending for a substantial portion of the width of the lid 46. The steel reinforcements 68 may be rectangular, tubular, hollow or solid and may extend on the lid 46 between the upper margins of the sidewalls 42 and the swept-back portions 52. Similar structure may also be employed in connection with the sidewalls 42, center wall 44 and the swept-back portions 52.

Figure 8:
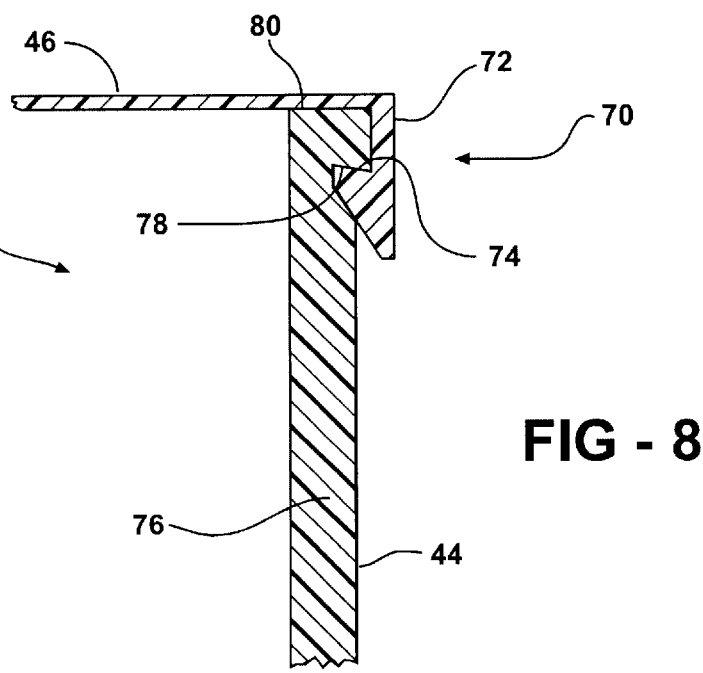
FIG. 8 is a cross-sectional side view of the lid hinging mechanism of the present invention.
Figure 10:
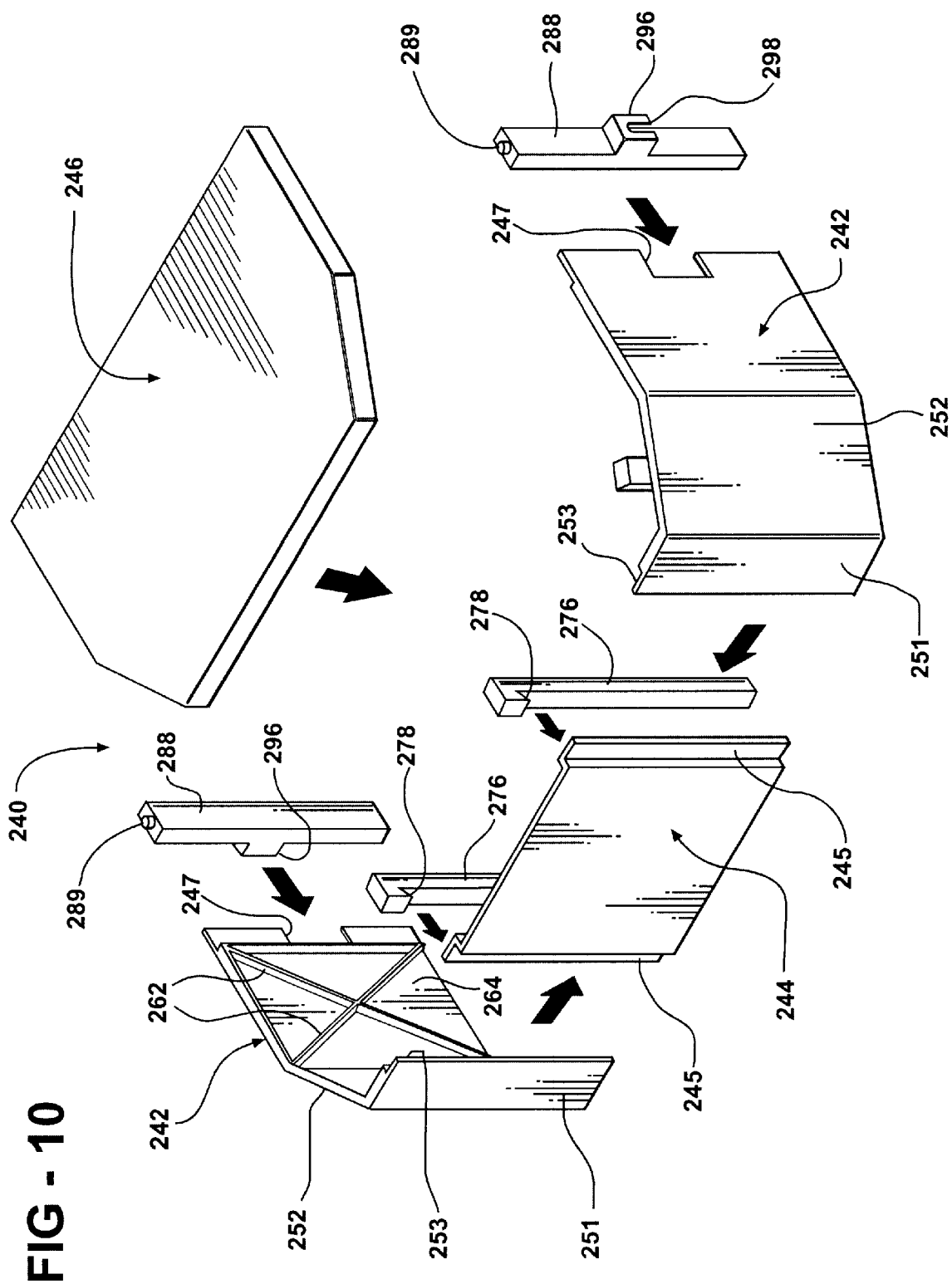
FIG. 10 and is an exploded view of an alternative embodiment of the present invention manufactured using a blow molding process.
Figure 14:
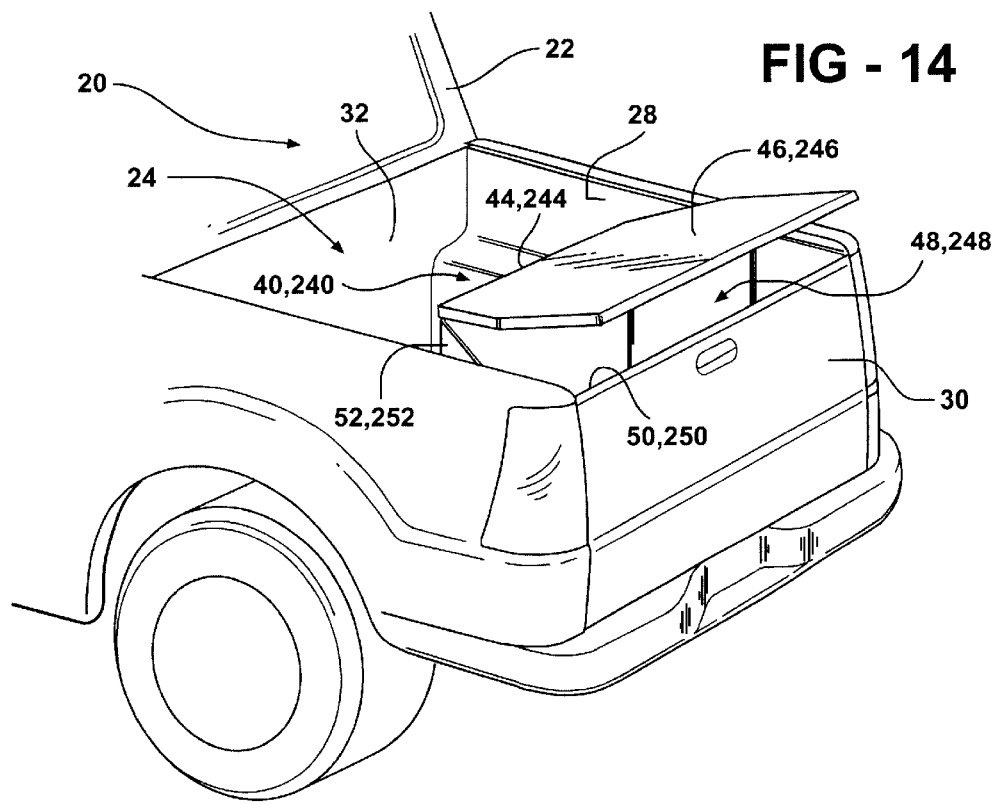
FIG. 14 is a perspective view of the present invention shown in its stored position with the lid partiality rotated to an intermediate opened position.

As best shown in FIGS. 8 and 14, in the preferred embodiment, the lid 46 is hingedly supported by the pair of sidewalls 42, the center wall 44 and the swept-back portions 52 for rotation about an axis extending parallel to the plane defined by the center wall 44. Thus, the hinging function of the lid 46 allows access to the enclosure 48 defined by the vehicle cargo area extender 40.

More specifically, and with reference to FIG. 8, the lid 46 may include one or more hinge portions, generally indicated at 70, that, when the lid is in its operative mode, extend downwardly from the lid 46 toward the vehicle bed 26. As illustrated in these figures, the hinge portions 70 may be located along the shorter edge 72 of the lid 46 opposite the open end 50 defined by the enclosure 48. However, those having ordinary skill in the art will appreciate that the lid 46 may be hingedly supported to any one of the sidewalls 42, the center wall 44 or the swept-back portions 52 without departing from the scope of the claimed invention.

Each hinge portion 70 defines an inwardly extending lip 74. On the other hand, the center wall 44, for example, may include upstanding struts, generally indicated at 76, located thereon so as to correspond to the location of the hinge portions 70. Each strut 76 includes a corresponding ledge 78 defined proximate its terminal end 80. The ledge 78 is configured to cooperate with the lip 74 defined by the hinge portion 70 on the lid 46. The cooperative interaction of the lip 74 and the ledge 78 function to allow rotation of the lid 46 about an axis contained in a plane that is parallel to the center wall 44, as noted above. Furthermore, the lip 74 and ledge 78 also function to assist in the retention of the lid 46 upon the upper margins of the side and center walls 42, 44 as well as the swept-back portions 52 so as to define the enclosure 48. However, those having ordinary skill in the art will appreciate that numerous structural variations and substitutions may be employed at the relevant juncture to provide the hinging and/or retaining function of the lid 46 relative to the side and center walls 42, 44, as well as the swept-back portions 52, respectively, without departing from the scope of the claimed invention. For example only, and not by way of limitation, the sidewalls, center wall, as well as the lid may be configured so as to present cooperating flanges and channels at the appropriate locations on the upper margins of the side and center walls and the perimeter of the lid which cooperate such that the lid may be slidably retained with respect to the side and center walls.

Figure 7:
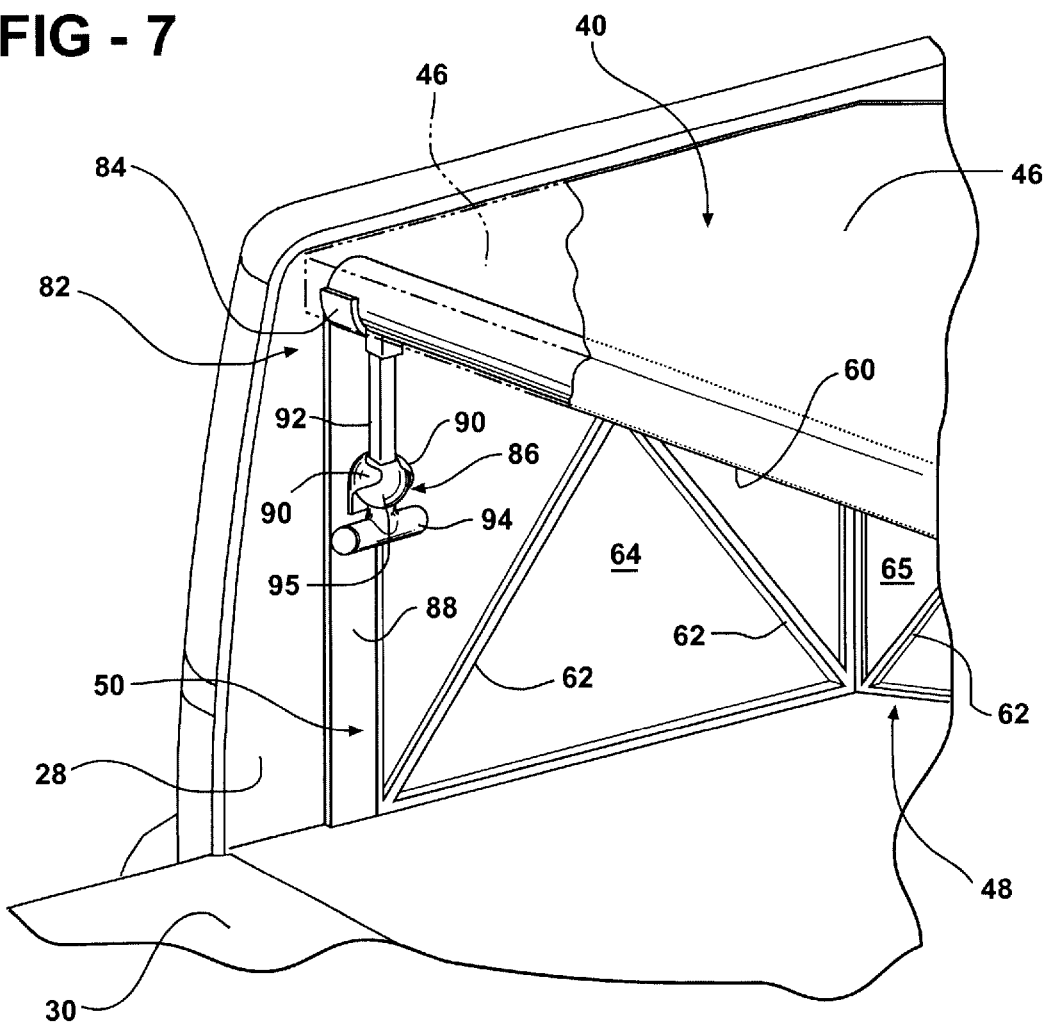
FIG. 7 is a partial broken-away perspective view of the lid retaining mechanism of the present invention.

Further, as best shown in FIG. 7 with respect to the preferred embodiment, the cargo area extender 40 includes a retainer mechanism, generally indicated at 82. The retainer mechanism 82 is located opposite the hinge portion 70 and, in the preferred embodiment disclosed herein, is adjacent to the open end 50 defined by the enclosure 48. More specifically, the retainer mechanism 82 may include a yoke 84 mounted, for example, to a steel-reinforcing member 68 presented by the inner surface 60 of the lid 46. A saddle, generally indicated at 86, is mounted to the sidewall 42. More specifically, the saddle 86 is preferably mounted to a strut 88 located near the marginal edge of the sidewall 42 proximate to the opening 50 defined by the enclosure 48. The saddle 86 is spaced from, but substantially aligned with the yoke 48. The saddle 86 presents a keeper bracket that is defined by a pair of spaced fingers 90. An elastic member 92 is fixedly attached to the yoke 84 and terminates in a T-shaped cleat 94. The T-shaped cleat 94 has a bulging spherical member 95 that may be engaged by the fingers 90 of the saddle 86 thereby biasing the lid 46 toward the upper margins of the side and center walls 42, 44, as well as the swept-back portions 52, respectively. In this way, the lid 46 may be releasably retained in its closed position relative to the side and center walls. However, like the structure illustrated in connection with the hinging function of the lid 46, those having ordinary skill in the art will appreciate that numerous variations and substitutions for the structure described herein to releasably retain the lid in its closed position may be employed without departing from the scope of the claimed invention.

Figure 15:
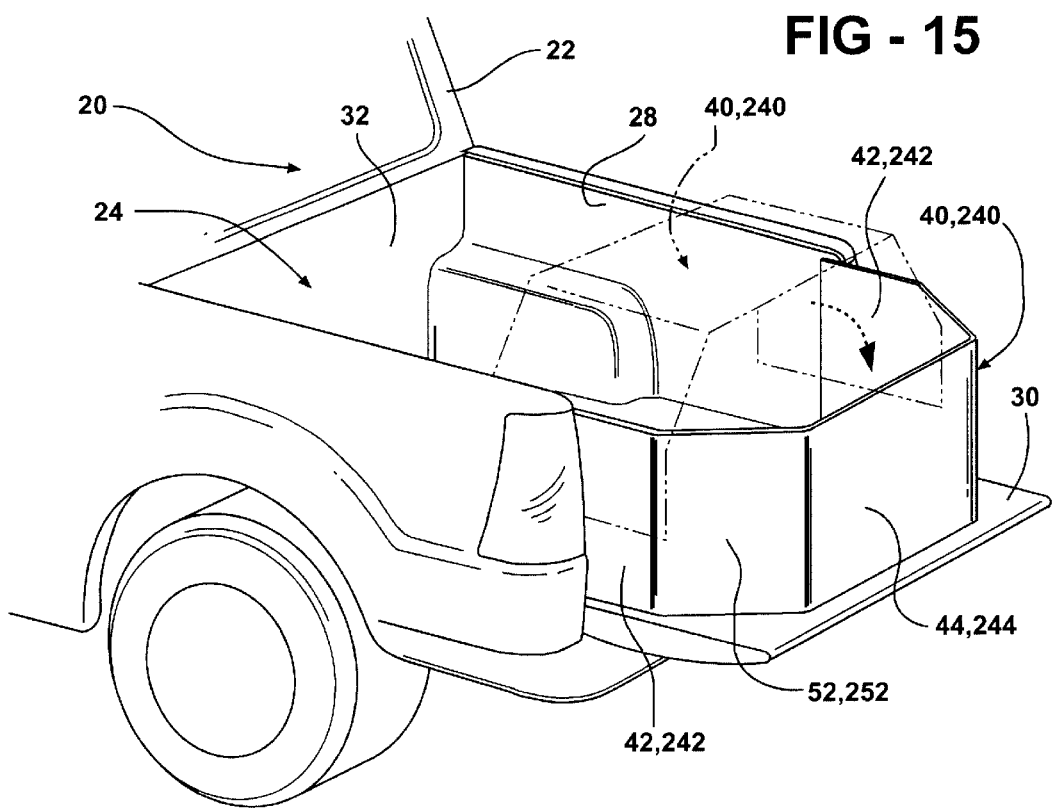
FIG. 15 is a perspective view of the present invention with the lid removed and shown in its deployed position over the rear wall of the vehicle cargo area.
Figure 16:
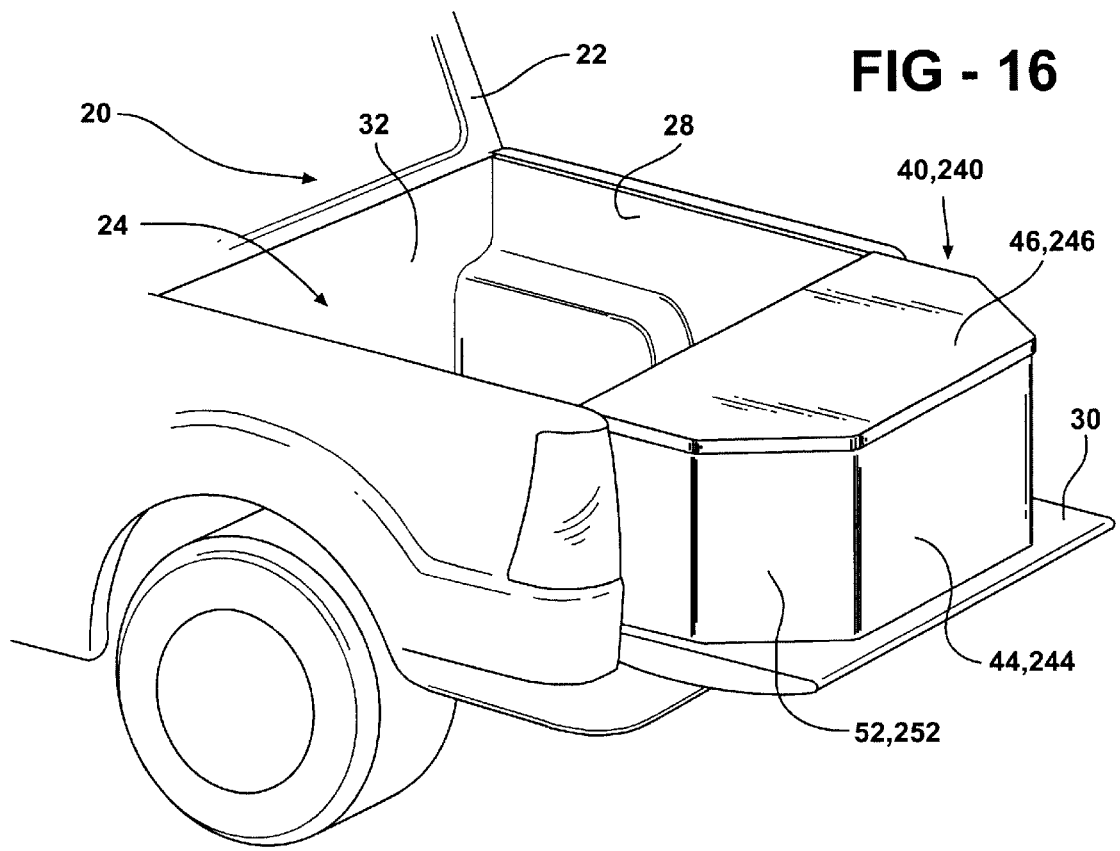
FIG. 16 is a perspective view of the present invention with the lid on and shown in its deployed position over the rear wall of the vehicle cargo area.
Figure 17:
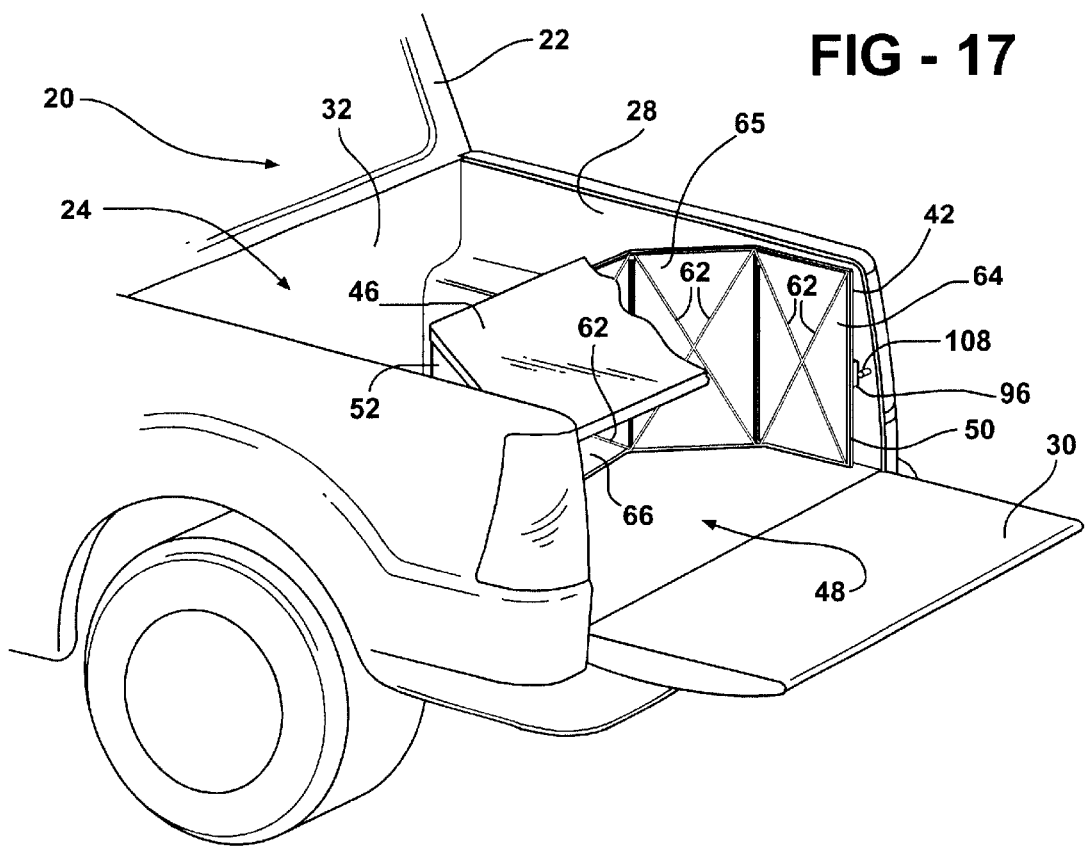
FIG. 17 is a partial broken away perspective view of the present invention with the lid on and shown in its stored position with the tailgate down.

The vehicle cargo area extender 40 of the present invention is movably mounted between a stored position (FIGS. 11–14, 17 and 18) and a deployed position (FIGS. 15 and 16). In its stored position, the open end 50 of the enclosure 48 is adjacent to the rear wall 30 of the vehicle cargo area 24 when the rear wall 30 is disposed in its upright position (FIGS. 11 and 14). In this way, the rear wall acts to close the open end 50 of the cargo area extender 40 but allows for selective access into the enclosure 50 as shown in FIG. 17. On the other hand, and when it is disposed in its deployed position, the vehicle cargo area extender 40 of the present invention is supported by the rear wall 30 when it is "down" or in its extended position. In this operative mode, the open end 50 of the enclosure 48 faces the vehicle cargo area 24. In this way, the present invention increases the effective size of the vehicle cargo area 24.

More specifically and as illustrated in FIGS. 9 and 15, the vehicle cargo area extender 40 of the present invention is pivotably mounted to the vehicle 20 about an axis extending between the pair of side walls 42. Thus, the vehicle cargo area extender 40 is pivotable between a stored position and a deployed position as noted above. To this end and with reference to FIGS. 3 and 9, each of the sidewalls 42 includes a bracket 96 having a slot 98 and a retainer 100. Preferably, and as illustrated in FIG. 9, the bracket 96 is mounted to a boss 102 formed on each sidewall 42 of the present invention. The slot 98 in each bracket 96 defines an open end 104 and a closed end 106. Each slot 98 is adapted to receive a stud 108 presented by the adjacent upstanding wall 28 on the vehicle 20. Preferably, the stud 108 extends from the D-pillar 109 of the vehicle cargo area, which is typically formed on the rear inner portion of the upstanding sidewall 28.

Thus, in one installation mode contemplated in the preferred embodiment, the cargo area extender 40 of the present invention is positioned above the vehicle bed 26 so as to align the open end 104 of the slot 98 with the stud 108. The cargo area extender 40 is then lowered relative to the vehicle bed 26 so that the stud 108 is received through the open end 104 of the slot 98 and into registry with the closed end 106. In the preferred embodiment, the slot 98 may be defined in the bracket 96 such that the open end 104 faces in the direction of the vehicle bed 26 when the cargo area extender 40 is in its stored position. Alternatively, the slot 98 may be defined in the bracket 96 such that the open end 104 faces in the direction of the vehicle cargo area 24 when the cargo area extender 40 is in its deployed position. In this operative installation mode, the vehicle cargo area extender 40 is supported upon the extended tailgate 30 and slid forward relative to the vehicle cargo area 24 until the stud 108 is received in the slot 98.

The retainer 100 acts to prevent inadvertent disengagement between the slot 98 and the stud 108. To this end, the retainer 100 is defined by a tongue 110 which is biased to a first position so as to close the open end 104 of the slot 98. The tongue 110 is moveable between a first position wherein the retainer 100 acts to close the open end 104 of the slot 98 and a second position disposed spaced from the open end 104 of the slot 98. The tongue 110 may be manually moved to its second, open position or under the influence of the stud 108 as the cargo area extender 40 is lowered onto the bed. In either event, the stud 108 may be received and retained in the slot 98.

The vehicle cargo area extender 40 of the present invention may be removed from the vehicle cargo area 24 only when the tongue 110 is depressed or moved to its open position thereby allowing the stud to move past the open end 104 of the slot 98, for example, as the vehicle cargo area extender 40 of the present invention is lifted in either a generally vertical direction or rearwardly away from the cargo area 24 as illustrated in these figures. In this way, the vehicle cargo area extender 40 of the present invention may be releasably mounted to the vehicle 20 such that it is pivotable about the axis defined by the studs 108 between its stored and deployed positions.

In any event, those having ordinary skill in the art will appreciate that numerous variations and/or substitutions may be made to the specific structure described and illustrated herein in connection with the pivoting function of the present invention without departing from the scope of the claimed invention.

In the preferred embodiment illustrated in FIGS. 3–9 the sidewalls 42, center wall 44, and lid 46 are manufactured of plastic using an injection molded process, a gas-assisted injection-molding process, or a structural foam-molding process. Furthermore, as presently contemplated, the sidewalls 42, center wall 44 as well as the swept-back portions 52 may be molded as one integral plastic component. Alternatively, those having ordinary skill in the art will appreciate that the sidewalls 42, center wall 44 and swept-back portions 52 may be molded as individual components and fastened together using any suitable fastening mechanism now known or invented in the future.

Alternatively, the sidewalls, center wall, swept-back portions and lid may be manufacturing using a blow-molding process. For example, an alternate embodiment of the vehicle cargo area extender of the present invention is generally indicated at 240 in the exploded view of FIG. 10, where like numerals are used to designate like structure of the type illustrated in FIGS. 3–9, but increased by a factor of 200. More specifically, and like the embodiment described above, the vehicle cargo area extender 240 includes a pair of sidewalls, generally indicated at 242 disposed spaced from one another, a center wall, generally indicated at 244 that extends between the pair of sidewalls 242 and a lid, generally indicated at 246. The lid 246 is removably disposed relative to the pair of sidewalls 242 and center wall 244 in the same or similar manner as described above.

In addition, each sidewall 242 defines a pair of swept-back portions 252 and a forward terminal edge panel 251. Each forward terminal edge panel 251 presents a flange 253 at its lateral distal edge. The center panel 244 includes a pair of corresponding flanges 245 extending along either lateral edge thereof and adapted for mating engagement with the distal flanges 253 formed on the forward, terminal edge panel 251 of the sidewalls 242. The center panel 244 and side panel 242 are interconnected at their respective flanges 251, 245 using any suitable fastening mechanism. In addition, this juncture may be strengthened by struts 276. Each strut 276 may include a ledge 278 that cooperates with a hinge portion (not shown in FIG. 10) of the type described with respect to FIG. 8. Furthermore, the inner surfaces of the sidewalls 242, swept-back portions 252 and center wall 244 may be strengthened by ribs 262.

The vehicle cargo area extender 240 is pivotally mounted to the vehicle 20 about an axis extending between the pair of sidewalls 42 in the same manner as described above. To this end, the cargo area extender 240 may include rear struts 288 mounted to the inner surface 264 of each sidewall 242. Each strut 288 includes a bracket 296 having a slot 298 and a retainer. Each sidewall 242 includes a notch 247 that corresponds to the bracket 296. The bracket 296 extends through the notch 247 to present the slot 298 and retainer for engagement with the stud 108 on the adjacent upstanding wall 28 of the vehicle 20 in the manner described above. In addition, the struts 288 may also include buttons 289 located at their upper terminal ends which are adapted to be received in corresponding recesses formed on the underside of the lid 246 for the purpose of retaining the lid 246 relative to the sidewalls 242.

Figure 18:
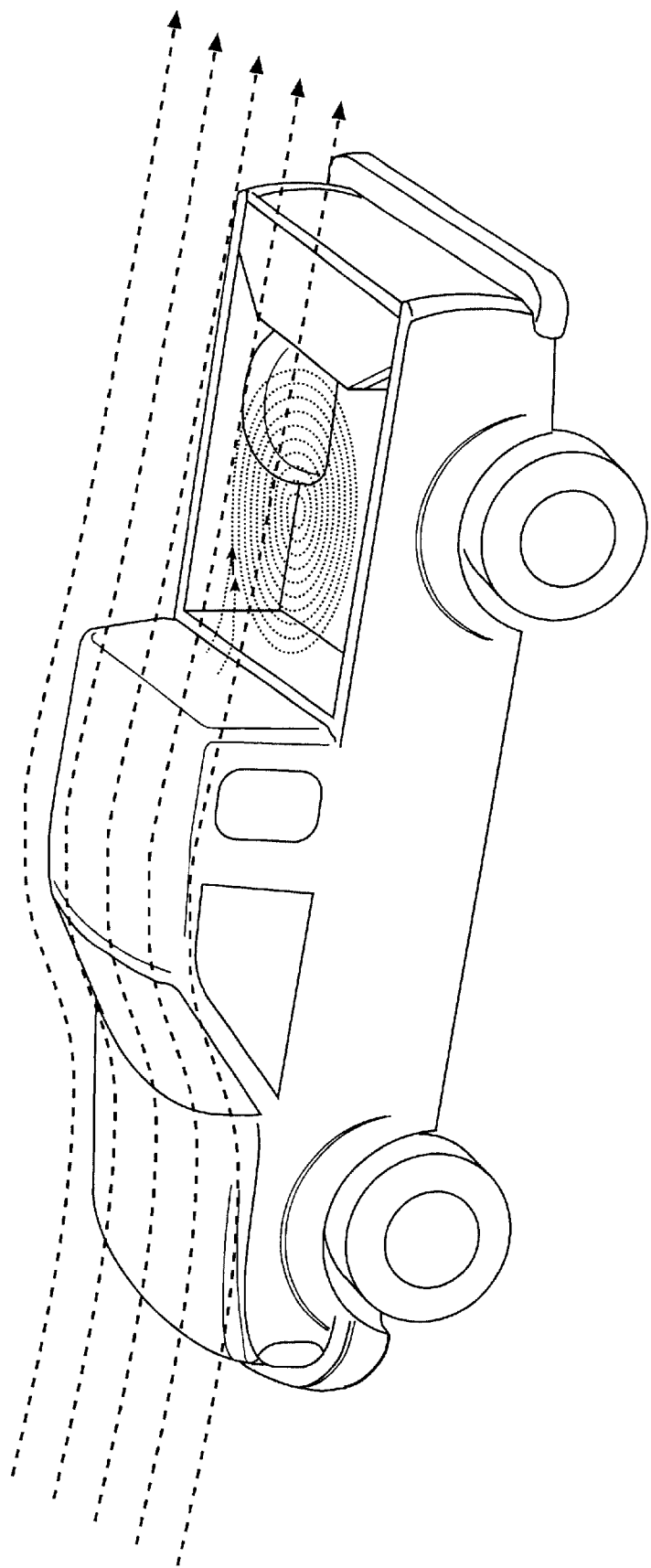
FIG. 18 is a perspective view of the present invention shown in its stored position with respect to a vehicle cargo area and illustrating the Aerodynamic effect it has in reducing drag on the vehicle.

Referring now to FIGS. 11, 17 and 18 it will appreciated that in one operative mode, the lid 46, 246 defines a substantially planer surface that extends across the rear portion of the vehicle cargo area 24 adjacent to the rear wall 30 when the rear wall 30 is disposed in its upright position. Furthermore, the lid 46, 246 extends inward relative to the rear wall 30 when the vehicle cargo area extender 40, 240 is disposed in its stored position. When it is disposed in its stored position, the vehicle cargo area extender 40, 240 of the present invention reduces aerodynamic drag on the vehicle 20 as will be described in greater detail below.

Figure 12:
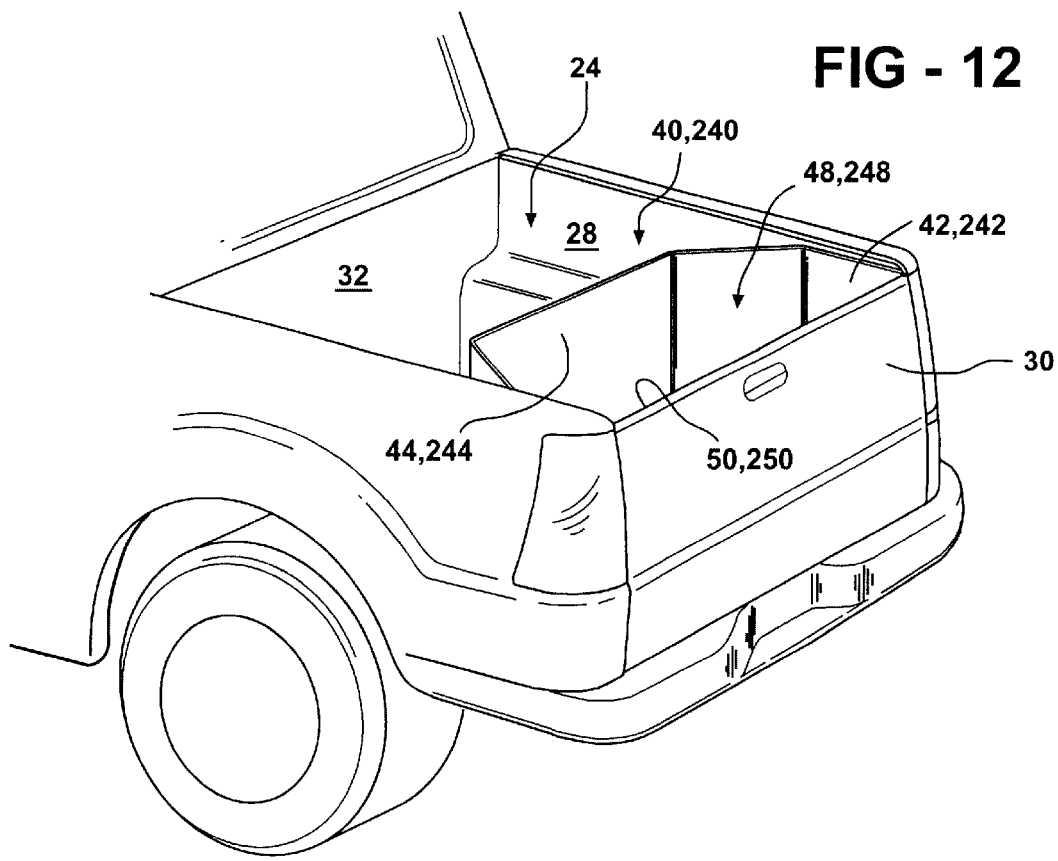
FIG. 12 is a perspective view of the present invention shown in its stored position with the lid removed.
Figure 13:
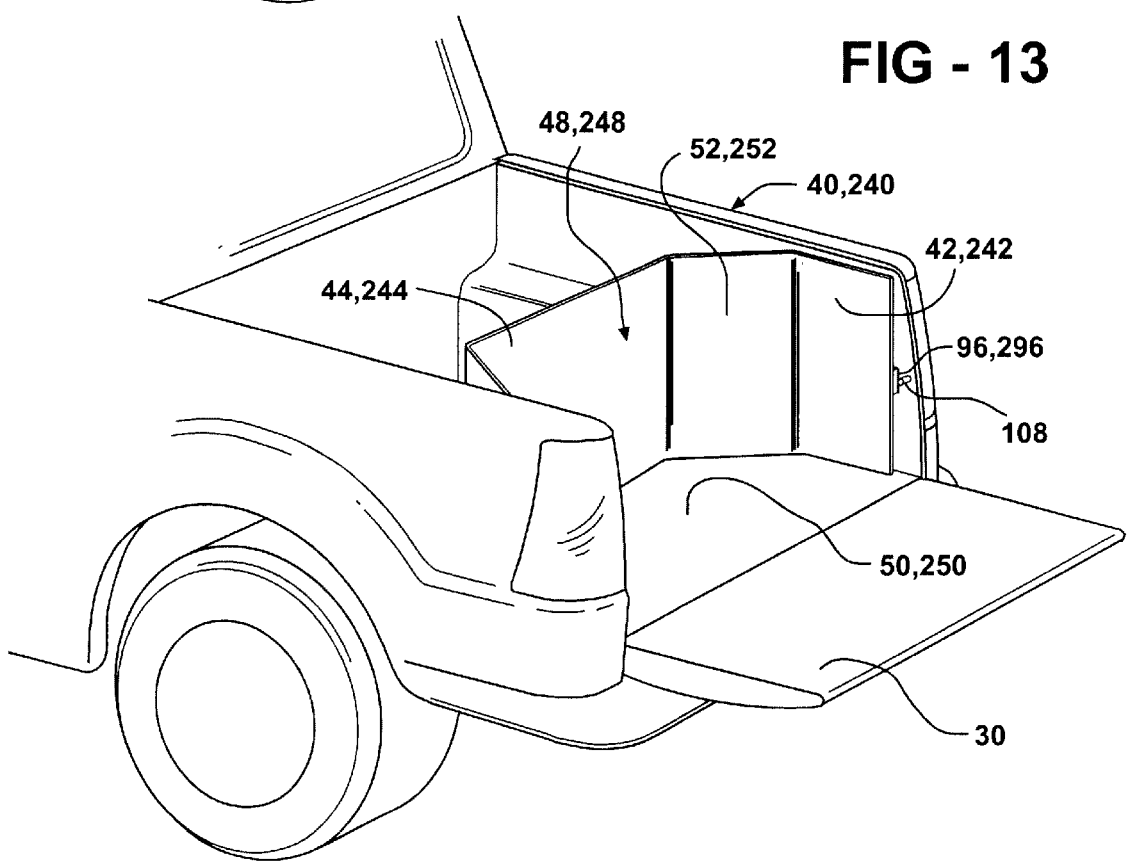
FIG. 13 is a perspective view of the present invention shown in its stored position with the lid removed and the tailgate down.

Alternatively and as illustrated in FIG. 12, the lid 46, 246 may be removed such that the enclosure 48, 248 opens upwardly. This feature thereby presents a partial enclosure 48, 248 which may be used to segregate selective cargo from the remaining cargo area. Furthermore, and as shown in FIGS. 14 and 16, the lid 46, 246 may be hingedly fastened to the sidewalls 42, 242 and center wall 44, 244 as described above when the cargo area extender 40, 240 is disposed in both its stored or deployed position. In this operative mode, the sidewalls 42, 242 and the center wall 44, 244 along with the lid 46, 246 define an open-ended enclosure 48, 248 such that the open end 50, 250 of the enclosure 48, 248 faces the cargo bed area 24.

FIG. 15 illustrates the pivoting functionality of the vehicle cargo area extender 40, 240 of the present invention. The pivoting action is illustrated in phantom in this figure. The cargo area extender 40, 240 is shown in solid lines in its deployed position supported by the tailgate 30 with the lid off. In this way, the entire cargo area 24 of the vehicle 20 is thereby enlarged.

As best shown in FIG. 18, forward movement of the vehicle 20 creates an aerodynamic flow of air over the cab 22 toward the rear wall or tailgate 30 of the vehicle. An area, generally indicated at 34, undisturbed by the flow of air over the cab 22 develops in the cargo area 24 adjacent to the cab 22 and the front wall 32. However, in the absence of the vehicle cargo bed extender of the present invention, the airflow will move in a downward direction toward the vehicle bed 26 as viewed in this figure and engage the tailgate 30 as is commonly known in the art. When this occurs, the tailgate 30 acts as a brake on the vehicle 20 thereby reducing its fuel efficiency. However, as illustrated in FIG. 18, when the cargo area extender 40, 240 of the present invention is disposed in its stored position inward relative to the rear wall 30, the lid 46, 246 eliminates the braking action caused by the tailgate 30. Thus, airflow studies indicate that the vehicle cargo area extender 40, 240 of the present invention improves the fuel economy of vehicles, such as pickup trucks and the like while minimizing added weight.

When considered in connection with the detailed description set forth above, it is readily apparent that the vehicle cargo area extender 40, 240 of the present invention may serve to increase the effective cargo area of the vehicle (FIGS. 15 and 16) while, at the same time, providing a means for securely storing tools and other valuable cargo, and protecting this cargo from the elements and from theft. To this end, the invention incorporates a releasable and/or pivotable lid that allows selective access to the enclosure 48 defined by the present invention. In addition, and as noted above, the vehicle cargo area extender 40, 240 of the present invention reduces the aerodynamic drag nominally caused by the vehicle cargo area. At the same, the vehicle cargo area extender 40, 240 of the present invention provides the above-identified features and advantages while still allowing open access to a portion of the cargo area 24 of the vehicle 20 even when it is disposed in its stored position forward of the tailgate 30. Finally, the vehicle cargo area extender 40, 240 of the present invention is lightweight, durable, versatile, easy to install and remove and is user-friendly. It is inexpensive to manufacture, cost-effective and facilitates the enhanced utility of the cargo area 24 found in pickup trucks and like vehicles.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A vehicle cargo area extender adapted to be employed in conjunction with a vehicle having a cargo area defined by a bed and a pair of upstanding sidewalls spaced from one another on either side of the vehicle bed and a rear wall extending between the upstanding sidewalls at one end on the bed, wherein the rear wall is rotatable from an upright position to an extended position so as to be disposed substantially co-planar with the vehicle bed, said cargo area extender comprising:

a pair of sidewalls spaced from one another, a center wall extending between said pair of sidewalls and a lid removably disposed relative to said pair of sidewalls and said center wall, said pair of sidewalls, said center wall and said lid cooperating to define an enclosure having open end;

said vehicle cargo area extender movably mounted between a stored position wherein the open end of said enclosure is adjacent to the rear wall of the vehicle cargo area when it is disposed in its upright position thereby closing the open end of said cargo area extender, and a deployed position so as to be supported by the rear wall of the vehicle cargo area when it is in its extended position such that the open end of said enclosure faces the vehicle cargo area thereby increasing the effective size of the vehicle cargo area.

2. A vehicle cargo area extender as set forth in claim 1 wherein said lid defines a substantially planar surface extending across the rear portion of the vehicle cargo area adjacent to the rear wall when it is disposed in its upright position and inward relative to the rear wall when it is disposed in its stored position.

3. A vehicle cargo area extender as set forth in claim 1 wherein said lid is hingedly supported by said pair of sidewalls and said center wall for rotation about an axis extending parallel to a plane defined by said center wall to allow access to said enclosure defined by said vehicle cargo area extender.

4. A vehicle cargo area extender as set forth in claim 1 wherein said lid may be supported by said pair of sidewalls and said center wall to define an open ended enclosure when said open end of said enclosure faces the cargo area when said vehicle cargo area extender is disposed in its deployed position.

5. A vehicle cargo area extender as set forth in claim 1 wherein said pair of sidewalls and said center wall cooperate to define a pair of swept-back portions extending at obtuse angles relative to and between the planes defined by the adjacent side and center walls.

6. A vehicle cargo area extender as set forth in claim 5 wherein said lid defines a six sided perimeter that is coextensive with respect to the perimeter defined by said pair of sidewalls, said center wall and said swept-back portions defined between adjacent portions of said side and center walls.

7. A vehicle cargo area extender as set forth in claim 1 wherein said pair of sidewalls and said center wall and said lid include reinforced portions that provide strength to said vehicle cargo area extender.

8. A vehicle cargo area extender as set forth in claim 7 wherein said reinforced portions include ribs defined in each of said pair of sidewalls, said center wall and said lid.

9. A vehicle cargo area extender as set forth in claim 8 wherein said reinforced portions include steel reinforcements extending for a portion of at least one of said pair of sidewalls, said center wall and said lid.

10. A vehicle cargo area extender as set forth in claim 1 wherein said pair of sidewalls, said center wall and said lid are manufactured using an injection molded process.

11. A vehicle cargo area extender as set forth in claim 1 wherein said pair of sidewalls, said center wall and said lid are manufactured using a blow molded process.

12. A vehicle cargo area extender adapted to be employed in conjunction with a vehicle having a cargo area defined by a bed and a pair of upstanding sidewalls spaced from one another on either side of the bed and a rear wall extending between the upstanding sidewalls at one end of the vehicle bed, wherein the rear wall is rotatable from an upright position to an extended position so as to be disposed substantially co-planar with the vehicle area, said cargo bed extender comprising:

a pair of sidewalls spaced from one another, a center wall extending between said pair of sidewalls and a lid removably disposed relative to said pair of sidewalls and said center wall, said pair of sidewalls, said center wall and said lid cooperating to define an enclosure having an open end;

said vehicle cargo area extender pivotally mounted to the vehicle cargo area about an axis extending between said pair of sidewalls between a stored position wherein the open end of said enclosure is adjacent to the rear wall of the vehicle cargo area when it is disposed in its upright position thereby closing the open end of said cargo area extender, and a deployed position so as to be supported by the rear wall of the vehicle cargo area when it is in its extended position such that the open end of said enclosure faces the vehicle cargo area thereby increasing the effective size of the vehicle cargo area.

13. A vehicle cargo area extender as set forth in claim 12 wherein each of said pair of sidewalls includes a bracket having a slot and a retainer, each slot adapted to receive a stud presented by the adjacent upstanding sidewalls on the vehicle, said retainer acting to prevent inadvertent disengagement between said slot and said stud, said vehicle cargo area extender being pivotable about an axis defined by said studs between said stored and said deployed positions.

14. A vehicle cargo area extender as set forth in claim 13 wherein said slot is has an open end and a closed end, said retainer movable between a first position wherein said retainer acts to close said open end of said slot and a second position disposed spaced from said open end of said slot such that the stud may be received and retained in said slot.

15. A vehicle cargo area extender as set forth in claim of 14 wherein said retainer is defined by a tongue biased to said first position so as to close said open end of said slot.

16. A vehicle cargo area extender as set forth in claim 15 wherein said slot is defined in said bracket such that said open end faces in the direction of the vehicle bed when said vehicle cargo area extender is in its stored position.

17. A vehicle cargo area extender as set forth in claim 15 wherein said slot is defined in said bracket such that said open end faces in the direction of the vehicle cargo area when said cargo area extender is in the its deployed position.

18. A vehicle cargo area extender as set forth in claim that 15 wherein each of said pair of sidewalls includes a boss formed thereon, said bracket being mounted to said boss.

* * * * *